(12) United States Patent
So et al.

(10) Patent No.: US 6,742,348 B2
(45) Date of Patent: Jun. 1, 2004

(54) METHOD FOR CONTROLLING LINEAR EXPANSION VALVE OF HEAT-PUMP TYPE AIR CONDITIONING SYSTEM USING MULTI-COMPRESSORS

(75) Inventors: Min Ho So, Seoul-si (KR); Won Hee Lee, Seoul-si (KR); Chang Min Choi, Seoul (KR); Yoon Jei Hwang, Seoul (KR); Deok Huh, Buchun-si (KR); Cheol Min Kim, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/377,612

(22) Filed: Mar. 4, 2003

(65) Prior Publication Data
US 2004/0050082 A1 Mar. 18, 2004

(30) Foreign Application Priority Data
Sep. 13, 2002 (KR) ................ 10-2002-0055789

(51) Int. Cl.[7] .............................................. F25B 41/04
(52) U.S. Cl. ........................................ 62/204; 62/228.5
(58) Field of Search .................... 62/204, 222, 224, 62/225, 228.5

(56) References Cited

U.S. PATENT DOCUMENTS

| | | | | |
|---|---|---|---|---|
| 4,499,739 A | * | 2/1985 | Matsuoka et al. | 62/212 |
| 5,829,262 A | * | 11/1998 | Urata et al. | 62/174 |
| 6,453,690 B1 | * | 9/2002 | Kim | 62/222 |
| 2004/0003604 A1 | * | 1/2004 | So et al. | 62/156 |

* cited by examiner

Primary Examiner—Marc Norman
(74) Attorney, Agent, or Firm—Greenblum & Bernstein, P.L.C.

(57) ABSTRACT

Disclosed is a method for controlling the aperture ratio of a linear expansion valve (LEV) so as to control the flow rate of refrigerant circulating in an air conditioning system. The LEV aperture ratio is controlled to range from the minimum value to the maximum value, which are determined according to the compressor's capacity and the cooling and heating modes. The LEV aperture ratio is controlled also based on the compressor's operating status, the change of the indoor fan's air volume, and whether or not the indoor fan operates. Such LEV control enables refrigerant to always be circulated at a suitable flow rate, improving the cooling and heating efficiencies, and also prevents liquid refrigerant from flowing into the compressor, securing high reliability of the compressor.

16 Claims, 5 Drawing Sheets

METHOD FOR CONTROLLING LINEAR EXPANSION VALVE OF HEAT-PUMP TYPE AIR CONDITIONING SYSTEM USING MULTI-COMPRESSORS

BACKGROUND OF THE INVENTION

1. Field of the Invention

The present invention relates to a method for controlling a linear expansion valve so as to suitably control the flow rate of refrigerant circulating in an air conditioning system, and more particularly to a method for controlling the aperture ratio of a linear expansion valve of a heat-pump type air conditioning system using a plurality of compressors.

2. Description of the Related Art

A general air conditioning system includes a compressor, a condenser, a linear expansion valve, and an evaporator. The compressor converts a low temperature and low pressure gaseous refrigerant into a high temperature and high pressure gaseous refrigerant. The condenser converts the high temperature and high pressure gaseous refrigerant, converted by the compressor, into a mid-temperature and high pressure liquid refrigerant. The linear expansion valve converts the mid-temperature and high pressure liquid refrigerant, converted by the condenser, into a low temperature and low pressure liquid refrigerant. The evaporator converts the low temperature and low pressure liquid refrigerant into a gaseous refrigerant.

On the other hand, the heat-pump type air conditioning system is provided with a four-way valve which changes the flow-path size of the refrigerant according to heating and cooling modes, whereby the functions of indoor and outdoor heat exchangers are changed. Namely, the indoor and outdoor exchangers serve as a condenser and an evaporator, respectively, in the heating mode, whereas both exchangers serve as an evaporator and a condenser, respectively, in the cooling mode.

In recent times, a plurality of compressors having different capacities are used to change the compression capacity according to a heating or cooling load, so as to optimize cooling and heating efficiencies.

As shown in FIG. 1, a heat-pump type air conditioning system using a plurality of compressors according to the prior art includes a plurality of compressors 11 and 12, an outdoor heat exchanger 14, an outdoor fan 14a, an linear expansion valve 15, an indoor heat exchanger 16, an indoor fan 16a, and a four-way valve 13. The compressors 11 and 12 compress refrigerant. The outdoor heat exchanger 14 allows heat exchange between the compressed refrigerant and outdoor air to condense the compresses refrigerant into a mid-temperature and high pressure liquid refrigerant. The outdoor fan 14a ventilates outdoor air toward the outdoor heat exchanger 14. The linear expansion valve 15 decompresses the mid-temperature and high pressure refrigerant into a low temperature and low pressure refrigerant. The indoor heat exchanger 16 allows heat exchange of the refrigerant passing through the linear expansion valve 15 with indoor air to evaporate the refrigerant and refrigerate the indoor air. The indoor fan 16a ventilates the indoor air toward the indoor air. The four-way valve 13 changes the flow-path size of the refrigerant according to the cooling and heating modes.

Based on the difference between a desired heating/cooling preset temperature and actual indoor temperature $T_4$, a controller 20 judges whether the cooling and heating loads are large or small and controls the operation of the compressors 11 and 12 so that either all or a part of the compressors are activated.

In addition, the controller 20 controls the four-way valve 13 to change the flow-path size of the refrigerant according to the cooling/heating mode, and detects pipe temperatures $T_1$ and $T_2$ of the indoor heat exchanger 16 and the outdoor heat exchanger 14 to control the operation of the indoor fan 16a and the outdoor fan 14a.

Further, the controller 20 allows a suitable amount of refrigerant to be circuited according to the cooling and heating loads. The controller 20 also detects the pipe temperatures $T_1$, $T_2$ and the inlet-side pipe temperature $T_3$, and controls the aperture ratio of the linear expansion valve 15 so as to maintain a suitable superheat.

However, the heat-pump type air conditioning system of the prior art has the following problems. If a connection pipe of the outdoor and indoor heat exchanger 14 and 16 is composed of a long pipe, a pressure drop occurs while the refrigerant passes through the long pipe, reducing the inlet-side pipe temperature $T_3$. This causes the current superheat to be significantly lower than the target superheat set at the time of designing the system. Accordingly, the controller 20 judges there to be a large amount of circulating refrigerant and thus reduces the aperture ratio of the linear expansion valve 15 so as to reduce the flow rate of refrigerant. Thereby, the flow rate of circulating refrigerant is sharply reduced, resulting in a shortage of the flow rate of refrigerant compared to the cooling load.

In addition, when the connection pipe of the indoor and outdoor heat is composed of a short pipe, or the flow rate of the circulating refrigerant is insufficient, the inlet pipe temperature $T_3$ becomes high, causing the current superheat to exceed the target superheat. This causes the controller 20 to control the linear expansion valve 15 to have a higher aperture ratio, thereby sharply increasing the flow rate of circulating refrigerant. This causes liquid refrigerant to flow into the compressors 11 and 12.

Further, the controller 20 detects indoor temperature $T_4$ and outdoor temperature $T_5$, and controls the operation of the indoor and outdoor fans 16a and 14a and the aperture ratio of the linear expansion valve according to the cooling and heating loads. However, if the cooling and heating loads increase, the aperture ratio of the linear expansion valve 15 sharply increases, and thus the amount of the circulating refrigerant sharply increases, consequently causing a problem in that liquid refrigerant flows into the compressors 11 and 12.

Moreover, when the air volume of the indoor fan 16a decreases, or when the outdoor fan 14a is turned off in order to prevent heating overload under a condition of high outdoor temperature during the heating operation, refrigerant passing through the indoor heat exchanger 16 or the outdoor heat exchanger 14 is insufficiently evaporated, causing liquid refrigerant to flow into the compressors 11 and 12.

SUMMARY OF THE INVENTION

Therefore, the present invention has been made in view of the above problems, and it is an object of the present invention to provide a method for controlling a linear expansion valve of an air conditioning system, wherein the flow rate of circulating refrigerant is prevented from being deficient or excessive at any operation environment of the air conditioning system so that the refrigerant is always circulated at a suitable flow rate, thereby improving the air conditioning performance and also securing high reliability of the air conditioning system.

It is another object of the present invention to provide a method for controlling a linear expansion valve of an air conditioning system, wherein the aperture ratio of the linear expansion valve is controlled so that a suitable amount of refrigerant is circulated, irrespective of whether a connection pipe of indoor and outdoor heat exchangers is composed of a long pipe or a short pipe.

It is still another object of the present invention to provide a method for controlling a linear expansion valve in an air conditioning system using a plurality of compressors, wherein the aperture ratio of the linear expansion valve is controlled so that the liquid refrigerant is prevented from flowing into the compressors when the compression capacity of the refrigerant is changed according to cooling and heating loads.

It is yet another object of the present invention to provide a method for controlling a linear expansion valve of an air conditioning system, wherein the opening valve of the linear expansion valve is controlled according to the operation status of an indoor or outdoor fan so as to prevent the liquid refrigerant from flowing into the compressor.

In accordance with one aspect of the present invention, the above and other objects can be accomplished by the provision of a method for controlling a linear expansion valve of an air conditioning system, wherein a refrigerant compression capacity of a compressor is changed according to cooling and heating loads, and an aperture ratio of the linear expansion valve, mounted between an indoor heat exchanger and an outdoor heat exchanger, is controlled in response to the change of the refrigerant compression capacity, the method comprising:

a first step of determining a minimum value and a maximum value of a range within which the aperture ratio of the linear expansion valve is controlled, according to each of refrigerant compression capacities to be changed; and a second step of, when the refrigerant compression capacity is changed according to the cooling and heating loads, controlling the aperture ratio of the linear expansion valve in the range from the minimum value to the maximum value, which are determined according to each of the changed refrigerant compression capacities.

In accordance with another aspect of the present invention, there is provided a method for controlling a linear expansion valve of an air conditioning system, wherein as a refrigerant compression capacity of a compressor is reduced from a first set value to a second set value, an aperture ratio of the linear expansion valve is reduced by a predetermined value from a first specific value to a second specific value, and wherein when the refrigerant compression capacity of the compressor increases from the second set value to the first set value, the aperture ratio of the linear expansion valve increases from the second specific value by a value less than the predetermined value, and, after the air conditioning system operates for a predetermined time, the aperture ratio increases to the first specific value, allowing the operation of the air conditioning system.

In accordance with still another aspect of the present invention, there is provided a method for controlling a linear expansion valve of an air conditioning system wherein, while the system operates in a cooling mode, when air volume of an indoor pan decreases, the aperture ratio of the linear expansion valve decreases.

In accordance with yet another aspect of the present invention, there is provided a method for controlling a linear expansion valve of an air conditioning system, wherein when the system operates in a heating mode, if an outdoor fan is turned off, stopping its operation, an aperture ratio of the linear expansion valve is controlled to be a fourth set value which is less than a third set value by a predetermined value, said third set value being equal to an aperture value when the outdoor fan operates, and thereafter when the outdoor fan is turned on, the aperture ratio increases by a value less than the predetermined value, and, after a predetermined time, the aperture ratio increases to be the third set value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
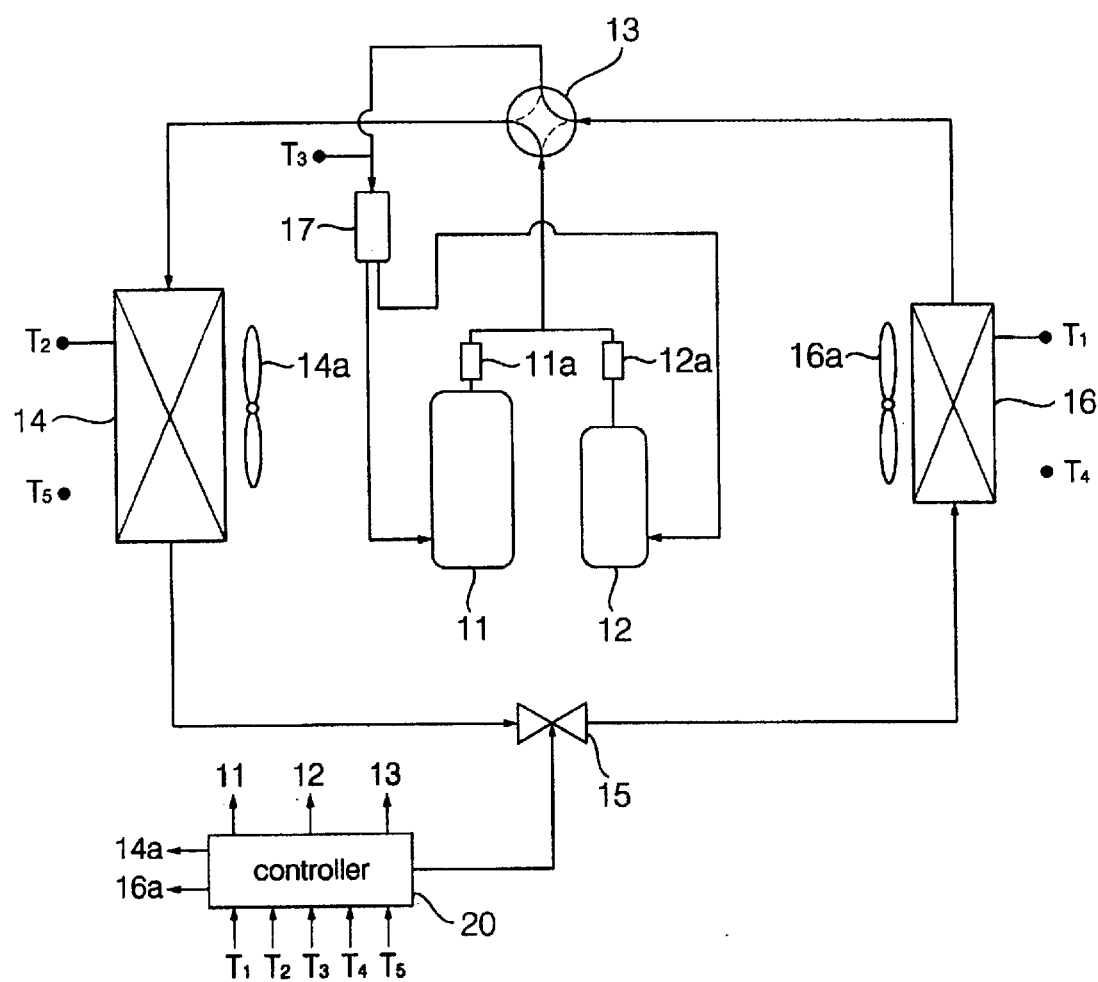
FIG. 1 is a view showing an air conditioning system according to the prior art.

Now, preferred embodiments of the present invention will be described in detail referring to the drawings.

There are no differences between the air conditioning system according to the prior art as shown in FIG. 1 and an air conditioning system to which the present invention is applied, so the present invention will be described referring to FIG. 1.

In the following description, it is assumed that the entire refrigerant compression capacity ratio is 100% when the two compressors 11 and 12 both operate, the ratio to the entire compression capacity is x% when only the large capacity compressor 11 operates, the ratio is y% when only the small capacity compressor 12 operates, and the refrigerant compression capacity of the large capacity compressor 11 is designed to be larger than that of the small capacity compressor 12 (x>y).

Now, referring to FIGS. 1 and 2 and the following Table 1, a description will be given of a method for controlling a Linear Expansion Valve (hereinafter, also referred to as an "LEV") of an air conditioning system according to a first embodiment of the present invention. When the aperture ratio of the LEV is 0 pulse, it is considered that the LEV is fully closed, and, when the aperture ratio is 500 pulses, it is considered that the LEV is fully opened. Accordingly, when the aperture ratio of the LEV is changed to Z pulse, it means that the ratio of the refrigerant circulation flow-path size to the entire flow-path size is changed to $(Z/500) \times 100\%$ by the LEV.

The following Table 1 shows the maximum and minimum aperture ratios of the linear expansion valve LEV in cases where the heat-pump type air conditioning system operates in the cooling mode with the maximum refrigerant compression capacity and the minimum refrigerant compression capacity, respectively.

TABLE 1

Unit: 1 pulse

| Compressor | Cooling Mode | |
|---|---|---|
| LEV | Max. Capacity | Min. Capacity |
| Max. Aperture ratio | A | C = A X y/100 + $a_1$ |
| Min. Aperture ratio | B | D = B X y/100 + $a_2$ |

In table 1, A and B denote the maximum aperture ratio and the minimum aperture ratio of the LEV, respectively, determined at the time of designing the air conditioning system through a number of repeated experiments and according to design conditions in the case where the system operates in the cooling mode with the maximum refrigerant compression capacity, i.e., with both the compressors 11 and 12 being operated. The maximum and minimum aperture ratios A and B are determined so that liquid refrigerant is prevented from flowing into the compressors 14 and 16, if less than the maximum aperture ratio A, and the flow rate of circulating refrigerant is prevented from being deficient, if more than the minimum aperture ratio B, irrespective of the length of the connection pipe and the operating conditions of the indoor and outdoor heat compressors 14 and 16.

In table 1, C and D denote the maximum aperture ratio and the minimum aperture ratio of the LEV, respectively, determined in the case where the system operates in the cooling mode with the minimum refrigerant compression capacity, i.e., with only the compressor 12 being operated. These maximum and minimum aperture ratios C and D are obtained by adding $a_1$ and $a_2$ (pulse value) to values (A×y/100) and (B×y/100), respectively, which are obtained by multiplying the maximum and minimum aperture ratios A and B of the maximum compression capacity by the refrigerant compression capacity ratio (y/100) of the currently-operating small capacity compressor 12, respectively. The values $a_1$ and $a_2$ are determined such that $a_1 > a_2$.

The following Table 2 shows the maximum and minimum aperture ratios of the LEV with respect to the refrigerant compression capacity when the system operates in the heating mode.

TABLE 2

Unit: 1 pulse

| Compressor | Heating Mode | |
|---|---|---|
| LEV | Max. Capacity | Med. Capacity |
| Max. Aperture ratio | E | G = E X y/100 + $a_3$ |
| Min. Aperture ratio | F | H = F X x/100 + $a_4$ |

In Table 2, the maximum refrigerant compression capacity (Max. Capacity) corresponds to the case where both the compressors 11 and 12 operate, and the minimum refrigerant compression capacity (Med. Capacity) corresponds to the case where only the large capacity compressor 11 operates.

Also in the heating mode, the maximum and minimum aperture ratios E and F of the LEV with the maximum refrigerant compression capacity are determined, similar to the cooling mode, so that liquid refrigerant is prevented from flowing into the compressors, and the flow rate of circulating refrigerant is prevented from being deficient, irrespective of the length of the connection pipe and the operating conditions. The maximum and minimum aperture ratios G and H of the LEV with the medium compression capacity are obtained by adding $a_3$ and $a_4$ (pulse value) to values (E×x/100) and (H×x/100), respectively, which are obtained by multiplying the maximum and minimum aperture ratios E and F of the maximum compression capacity by the refrigerant compression capacity ratio (x/100) of the currently-operating large capacity compressor 11, respectively. The values $a_3$ and $a_4$ are determined such that $a_3 > a_4$.

In Tables 1 and 2, when the refrigerant compression capacity ratio x of the large capacity compressor 11 is in the range of 55% to 65% relative to the entire capacity (when the refrigerant compression capacity ratio y of the small capacity compressor 12 is in the range of 35% to 45%), it is preferable that $a_1$ is in the range of 60 to 80 pulses, $a_2$ is in the range of 20 to 40 pulses, $a_3$ is in the range of 60 to 80 pulses, $a_4$ is in the range of 10 to 30 pulses. When x=60%, it is preferable that $a_1$=70 pulses, $a_2$=30 pulses, $a_3$=70 pulses, $a_4$=20 pulses.

When a value of 70 pulses is added to the existing aperture ratio of the LEV, it means that a flow-path size corresponding to 14%(=70 pulses/500 pulses×100%) of the entire flow-path size is additionally opened.

Figure 2:
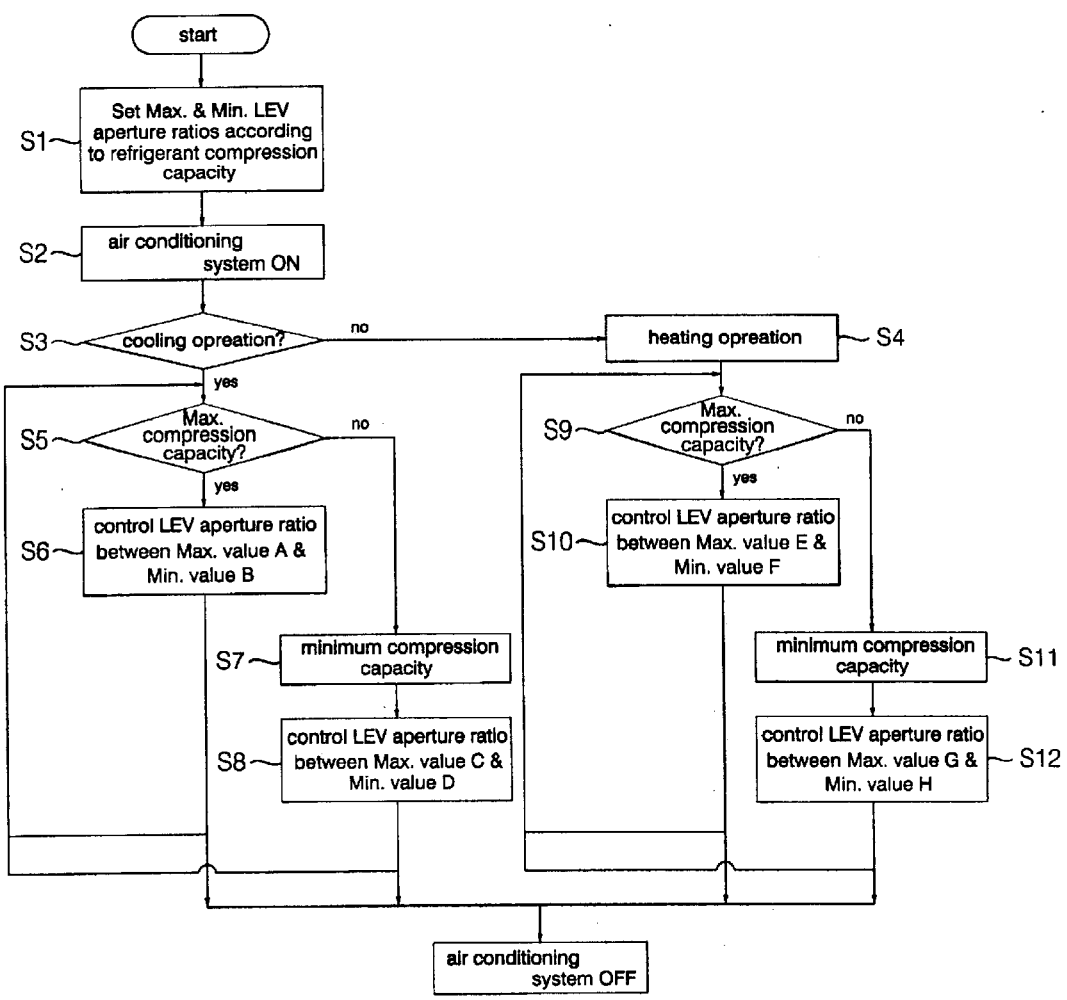
FIG. 2 is a flow chart showing a method for controlling a linear expansion valve of an air conditioning system according to a first embodiment of the present invention.

Now, a method for controlling the LEV of the air conditioning system according to the present invention is described, referring to FIG. 2.

As shown in Tables 1 and 2, the maximum and minimum values of LEV are determined according to the refrigerant compression capacity when the system respectively operates in cooling and heating modes ($S_1$).

Thereafter, when the air conditioning system is turned on and operates in the cooling mode ($S_2$, $S_3$), it is checked whether both the compressors 11 and 12 are operating with maximum compression capacity ($S_5$). It this checked result is affirmative, the LEV aperture ratio is controlled to vary in the range from the minimum value B to the maximum value A as shown in Table 1, according to the cooling load ($S_6$). If the checked result is that only the small capacity compressor 12 operates with the minimum compression capacity ($S_7$), the LEV aperture ratio is controlled to vary in the range from the minimum value D to the maximum value C as shown in Table 1, according to the cooling load ($S_8$).

On the other hand, in the case where the air conditioning system operates in the heating mode ($S_4$), if both the compressors 11 and 12 are operating with the maximum compression capacity ($S_9$), the LEV aperture ratio is controlled to vary in the range from the minimum value F to the maximum value E as shown in Table 2 ($S_{10}$). If only the large capacity compressor 11 operates with the medium compression capacity ($S_{11}$), the LEV aperture ratio is controlled to vary in the range from the minimum value H to the maximum value G as shown in Table 2 ($S_{12}$).

In other words, in the case where the connection pipe of the outdoor and indoor heat exchangers 14 and 16 is composed of a long pipe, the aperture ratio of the LEV 15 is prevented from dropping under the minimum value set according to the refrigerant compression capacity, so that refrigerant is always circulated at a suitable flow rate in the air conditioning system in any operating conditions. In the case where the connection pipe is composed of a short pipe, or the flow rate of refrigerant is deficient, increasing the aperture ratio of the LEV 15, the aperture ratio of the LEV 15 is prevented from exceeding the maximum value set according to each of refrigerant compression capacities, so that liquid refrigerant that failed to be evaporated in the indoor or outdoor heat exchanger 16 or 14 is prevented from flowing into the compressors 11 and 12.

Now, referring to Table 3 and FIG. 3, a description will be given of a method for controlling the VEV aperture ratio in the case where the refrigerant compression capacity of the air conditioning system varies depending on the cooling and heating loads, according to a second embodiment of the present invention.

TABLE 3

Unit: 1 pulse

| REFRIGERANT COMPRESS. CAPACITY | LEV APERTURE RATIO |
| --- | --- |
| Max. Capacity → Med. Capacity | $K_1$ = Current Value − ($b_1 + c_1$) |
| Med. Capacity → Max. Capacity | $K_2$ = Current Value − ($b_1$) |
| Max. Capacity → Min. Capacity | $K_3$ = Current Value − ($b_2 + c_2$) |
| Min. Capacity → Max. Capacity | $K_4$ = Current Value − ($b_2$) |

Here, the maximum capacity means that both the compressors 11 and 12 operate, the medium capacity means that only the large capacity compressor 11 operates, the minimum capacity means that only the small capacity compressor 12 operates, and the current aperture ratio means a LEV aperture ratio just before the refrigerant compression capacity is changed.

According to the second embodiment of the present invention, as shown in Table 3, when the system operates in the cooling or heating mode, as the refrigerant compression capacity decreases, the LEV aperture ratio is controlled to drop from the current aperture ratio, whereas, as the refrigerant compression capacity increases, the LEV aperture ratio is controlled to rise. It can be seen from Table 3 that increments $b_1$ and $b_2$, by which the LEV aperture ratios $K_2$ and $K_4$ increase as the refrigerant compression capacity increases, is set lower than decrements $b_1+c_1$ and $b_2+c_2$, by which the LEV aperture ratios $K_1$ and $K_3$ decrease as the refrigerant compression capacity decreases. This is to prevent liquid refrigerant flow into the compressors 11 and 12, which is caused by a sharp increase in the flow rate of circulating refrigerant as the LEV aperture ratio sharply increases.

The values $b_1$, $b_2$, $c_1$, and $c_2$ are determined such that $b_1 < b_2$, and $c_1$ and $c_2$ are in the range of 20 to 40 pulses, and preferably 30 pulses.

Figure 3:
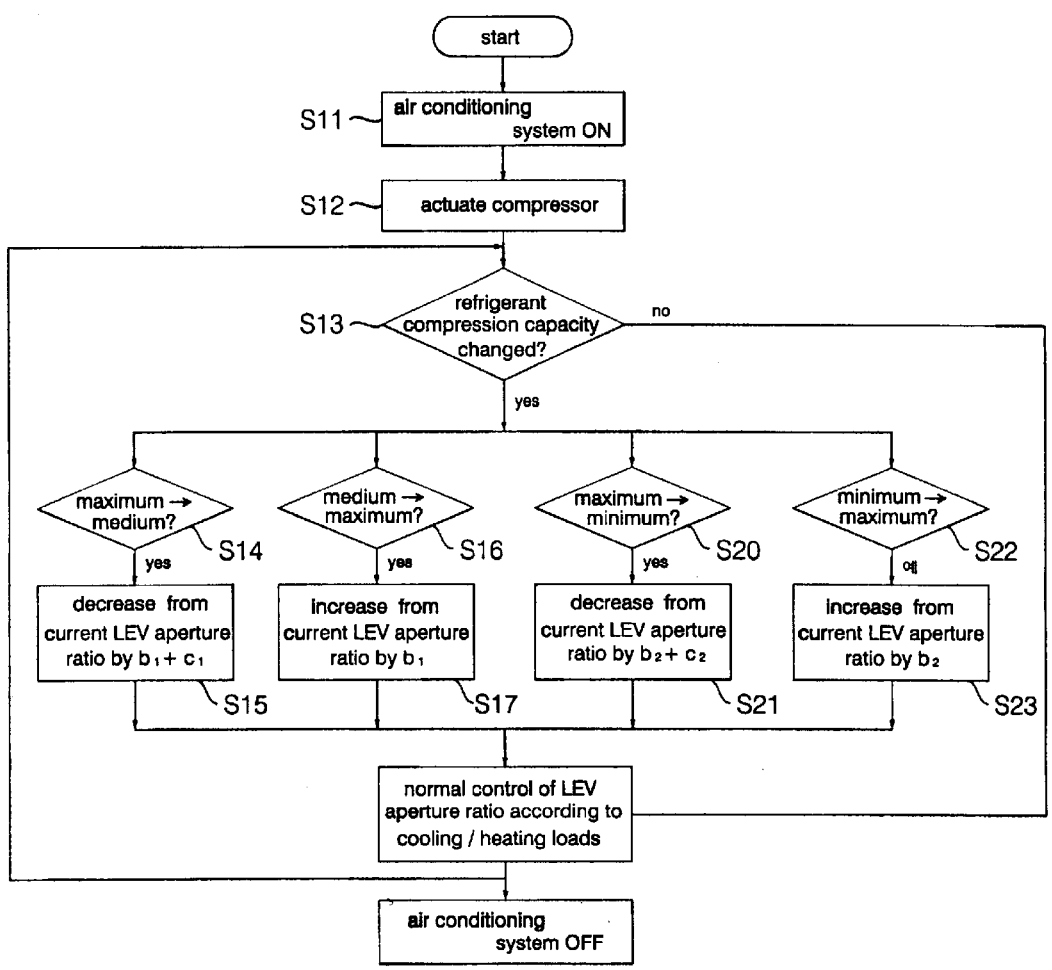
FIG. 3 is a flow chart showing a method for controlling a linear expansion valve of an air conditioning system according to a second embodiment of the present invention.

Now, the method for controlling the LEV aperture ratio according to the second embodiment of the present invention is described in more detail referring to FIG. 3.

When the air conditioning system is turned on, activating the compressor, it is checked whether or not the refrigerant compression capacity is changed ($S_{11}$, $S_{12}$, $S_{13}$).

When the refrigerant compression capacity is changed from the maximum capacity to the medium capacity, the LEV aperture ratio is controlled to drop from the current aperture ratio by ($b_1+c_1$) ($S_{14}$, $S_{15}$). When the refrigerant compression capacity is changed from the medium capacity to the maximum capacity, the LEV aperture ratio is controlled to rise from the current aperture ratio by $b_1$ ($S_{16}$, $S_{17}$).

On the other hand, when the refrigerant compression capacity is changed from the maximum capacity to the minimum capacity, the LEV aperture ratio is controlled to drop from the current aperture ratio by ($b_2+c_2$) ($S_{20}$, $S_{21}$). When the refrigerant compression capacity is changed from the minimum capacity to the maximum capacity, the LEV aperture ratio is controlled to rise by $b_2$ ($S_{22}$, $S_{23}$).

Thereafter, the LEV aperture ratio is normally controlled according to the cooling and heating loads.

As mentioned above, in the case where the refrigerant compression capacity increases, the LEV aperture ratio is controlled to be changed by an increment less than the decrement by which the refrigerant compression capacity decreases, and, after a predetermined time, the LEV aperture ratio is normally controlled, so as to prevent liquid refrigerant from flowing into the compressors due to the sharp increase of the LEV aperture ratio.

Instead of using Table 3, when the refrigerant compression capacity is changed, the LEV aperture ratio can be changed proportional to the capacity of a compressor to be turned on or off, as shown in the following Table 4.

TABLE 4

Unit: 1 pulse

| REFRIGERANT COMPRESS. CAPACITY | LEV APERTURE RATIO |
| --- | --- |
| Max. Capacity → Med. Capacity | $K_1'$ = Current Value (1−y100) + $c_1$ |
| Med. Capacity → Max. Capacity | $K_2'$ = Current Value (1−y100) |
| Max. Capacity → Min. Capacity | $K_3'$ = Current Value (1−x100) + $c_2$ |
| Min. Capacity → Max. Capacity | $K_4'$ = Current Value (1−x100) |

The description of Table 4 is followed as an example referring to a case where the refrigerant compression capacity is changed from the maximum compression capacity to the medium compression capacity. In this case, while both the compressors 11 and 12 operate, the small capacity compressor 12 is turned off. Therefore, the LEV aperture ratio $K_1'$ is given by the equation: $K_1'$=Current Value (1−y/100)+$c_1$, where the change of aperture ratio is proportional to the compression capacity ratio "y" of the small capacity compressor 12 turned off.

Now, referring to Table 5 and FIG. 4, a description will be given of a method for controlling the LEV aperture ratio when air volume of the indoor fan 16a is controlled by a user's operation in the cooling mode, according to a third embodiment of the present invention.

TABLE 5

| Air Volume of Indoor Fan | LEV Aperture Ratio |
| --- | --- |
| High → Medium<br>Medium → Low | Current Aperture Ratio − $d_1$ |
| High → Low | Current Aperture Ratio − 2$d_1$ |

When the air conditioning system operates in the cooling mode, if the user operates the indoor fan 16a to reduce the air volume, the amount of heat exchange between refrigerant passing through the indoor heat exchanger 16 and indoor air is reduced, so as to cause the problem of liquid refrigerant flowing into the compressor.

The third embodiment of the present invention aims to overcome such a problem. To this end, when the air volume of the indoor fan 16a is reduced by the user's operation in the cooling mode, the LEV aperture ratio is controlled to be reduced by a predetermined value $d_1$, from the current aperture ratio just before the change of the air volume, so as to reduce the flow rate of circulating refrigerant, thereby preventing liquid refrigerant from flowing into the compressors 11 and 12.

It is preferable that the value $d_1$ is in the range of 10 to 30 pulses.

Figure 4:
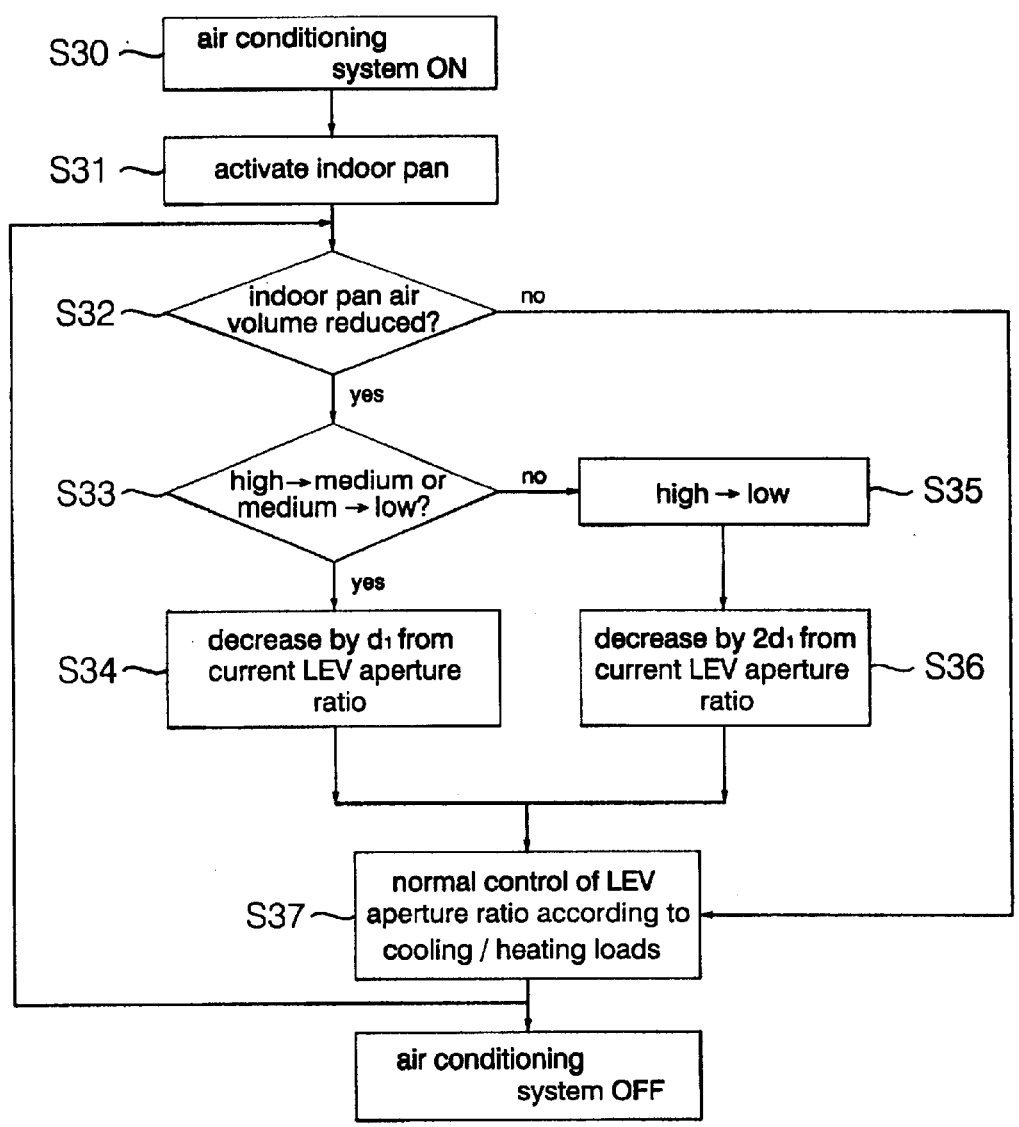
FIG. 4 is a flow chart showing a method for controlling a linear expansion valve of an air conditioning system according to a third embodiment of the present invention.

Referring to FIG. 4, the third embodiment of the present invention is described in more detail as follows.

When the air conditioning system starts the cooling operation by turning on the indoor fan ($S_{30}$, $S_{31}$), the controller judges whether the air volume is reduced ($S_{32}$). When the air volume of the indoor fan is reduced by one step, i.e., from high to medium or medium to low ($s_{33}$), the LEV aperture ratio is controlled to be reduced from the current aperture ratio by a predetermined value $d_1$ ($S_{34}$). When the air volume of the indoor fan is reduced by two steps, i.e., from high to low ($s_{35}$), the LEV aperture ratio is controlled to be reduced by $2d_1$ which is twice the predetermined value $d_1$ ($S_{36}$), and then the LEV aperture ratio is normally controlled according to the cooling load ($S_{37}$).

A fourth embodiment of the present invention relates to a method for controlling the LEV aperture ratio according to the operation of turning on or off the outdoor fan when the system operates in the heating mode. The fourth embodiment is described as follows referring to Table 6 and FIG. 5.

TABLE 6

| Outdoor Pan | LEV Aperture Ratio |
| --- | --- |
| ON → OFF | Current Aperture Ratio − e |
| OFF → ON | Current Aperture Ratio + (e − f) |

If the heating operation continues at outdoor temperature over a predetermined temperature, causing heating overload, the air conditioning system stops the ongoing operation of the outdoor fan 14a. However, the stopping of the outdoor fan 14a causes a reduction in the heat exchanged between outdoor air and the refrigerant passing through the outdoor heat exchanger 14, failing to sufficiently evaporate the refrigerant, which brings about the problem of liquid-refrigerant flowing into the compressors.

In the fourth embodiment according to the present invention, when the outdoor fan 14a is turned off, the LEV aperture ratio is controlled to decrease by a predetermined decrement (e) to reduce the flow rate of circulating refrigerant. This reduction allows refrigerant passing through the outdoor heat exchanger 14 to be fully evaporated, thereby preventing liquid refrigerant to flow into the compressors 11 and 12. On the other hand, when the outdoor fan 14a is turned on to start the operation, the LEV aperture ratio is controlled to increase by a value (e−f) less than the decrement (e), whereby liquid refrigerant that failed to be evaporated due to a sharp increase in the LEV aperture ratio is prevented from flowing into the compressors 11 and 12.

The value f is set in the range of 10 to 30 pulses, and preferably 20 pulses.

Figure 5:
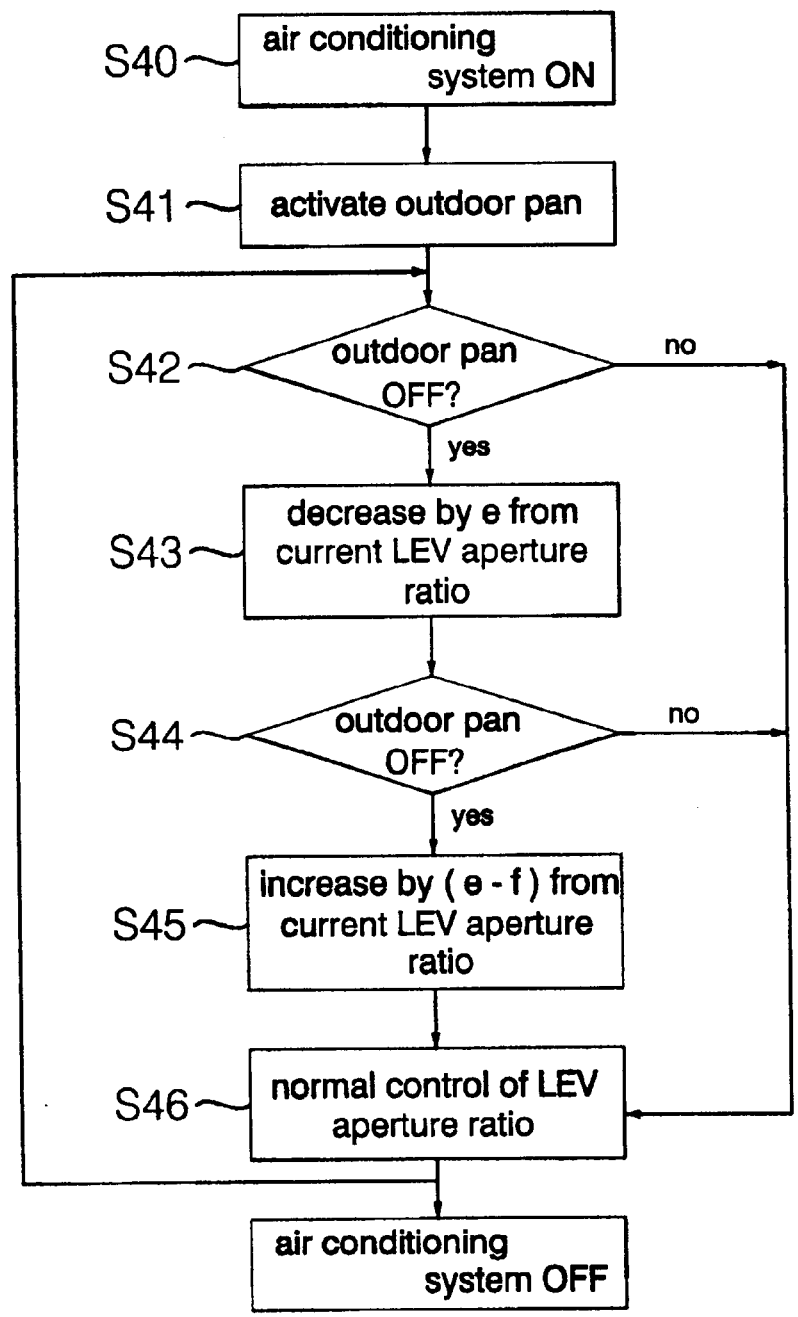
FIG. 5 is a flow chart showing a method for controlling a linear expansion valve of an air conditioning system according to a fourth embodiment of the present invention.

The fourth embodiment is described in more detail as follows referring to FIG. 5.

The air conditioning system and the outdoor fan are turned on, starting the heating operation, and then during the heating operation, it is detected whether the outdoor fan is turned off ($S_{40}$, $S_{41}$, $S_{42}$).

When the outdoor fan is turned off, the LEV aperture ratio is controlled to decrease by a predetermined decrement (e) from the current aperture ratio, and then the LEV aperture ratio is normally controlled according to the heating load ($S_{43}$, $S_{46}$).

If the outdoor fan is turned on to start the operation ($S_{44}$), the LEV aperture ratio is controlled to increase by a value (e−f) from the current aperture ratio ($S_{45}$), and then the LEV aperture ratio is normally controlled according to the heating load ($S_{46}$).

Apparent from the above description, according to the method for controlling the LEV of the air conditioning system according to the present invention, the LEV aperture ratio is controlled to range from the minimum value to the maximum value, which are determined according to the compressor's capacity and the cooling and heating modes, and the LEV aperture ratio is controlled also based on the compressor's operating status, the change of the indoor fan's air volume, and whether or not the indoor fan operates. Such LEV control enables refrigerant to always be circulated at a suitable flow rate, improving the cooling and heating efficiencies, and also prevents liquid refrigerant from flowing into the compressor, securing high reliability of the compressor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a linear expansion valve of an air conditioning system, wherein a refrigerant compression capacity of a compressor is changed according to cooling and heating loads, and an aperture ratio of the linear expansion valve, mounted between an indoor heat exchanger and an outdoor heat exchanger, is controlled in response to the change of the refrigerant compression capacity, the method comprising:

a first step of determining a minimum value and a maximum value of a range within which the aperture ratio of the linear expansion valve is controlled, according to each of refrigerant compression capacities to be changed; and a second step of, when the refrigerant compression capacity is changed, controlling the aperture ratio of the linear expansion valve in the range from the minimum value to the maximum value, which are determined according to the changed refrigerant compression capacity.

2. The method as set forth in claim 1, wherein while the air conditioning system operates in a cooling mode, if the refrigerant compression capacity is changed to a minimum refrigerant compression capacity, a maximum value C and a minimum value D of the aperture ratio of the linear expansion valve are expressed by the following equations:

$$C = A \times y/100 + a_1$$

$$D = B \times y/100 + a_2$$

where 'A' and 'B' denote a maximum value and a minimum value of the aperture ratio of the linear expansion valve, respectively, which are determined when the system operates in a cooling mode with a maximum refrigerant compression capacity, 'y' denotes a ratio (%) of the minimum refrigerant compression capacity to the maximum refrigerant compression capacity, and '$a_1$' and '$a_2$' denote predetermined aperture ratios, respectively.

3. The method as set forth in claim 2, wherein when the ratio y of the minimum refrigerant compression capacity is in a range of 35% to 45%, the predetermined aperture ratio $a_1$ is in a range of 60 to 80 pulses, and the predetermined aperture ratio $a_2$ is in a range of 20 to 40 pulses, where an aperture ratio '1' pulse of the linear expansion valve means that ('1'/500)×100% of the linear expansion valve is opened.

4. The method as set forth in claim 2, wherein when the ratio y of the minimum refrigerant compression capacity is 40%, the predetermined aperture ratio $a_1$ is in 70 pulses, and the predetermined aperture ratio $a_2$ is 30 pulses, where an aperture ratio '1' pulse of the linear expansion valve means that ('1'/500)×100% of the linear expansion valve is opened.

5. The method as set forth in claim 1, wherein while the air conditioning system operates in a heating mode, if the refrigerant compression capacity is changed to a medium refrigerant compression capacity, a maximum value G and a minimum value H of the aperture ratio of the linear expansion valve are expressed by the following equations:

$$G=E \times x/100 + a_3$$

$$H=F \times x/100 + a_4$$

where 'E' and 'F' denote a maximum value and a minimum value of the aperture ratio of the linear expansion valve, respectively, which are determined when the system operates in a heating mode with a maximum refrigerant compression capacity, 'x' denotes a ratio (%) of the medium refrigerant compression capacity to the maximum refrigerant compression capacity, and '$a_3$' and '$a_4$' denote predetermined aperture ratios, respectively.

6. The method as set forth in claim 5, wherein when the ratio x of the medium refrigerant compression capacity is in a range of 55% to 65%, the predetermined aperture ratio $a_3$ is in a range of 60 to 80 pulses, and the predetermined aperture ratio $a_4$ is in a range of 10 to 30 pulses, where an aperture ratio '1' pulse of the linear expansion valve means that ('1'/500)×100% of the linear expansion valve is opened.

7. The method as set forth in claim 5, wherein when the ratio x of the medium refrigerant compression capacity is 60%, the predetermined aperture ratio $a_3$ is in 70 pulses, and the predetermined aperture ratio $a_4$ is 20 pulses, where an aperture ratio '1' pulse of the linear expansion valve means that ('1'/500)×100% of the linear expansion valve is opened.

8. A method for controlling a linear expansion valve of an air conditioning system, wherein when a refrigerant compression capacity of a compressor decreases from a first set value to a second set value, an aperture ratio of the linear expansion valve is controlled to decrease by a first predetermined value from an aperture ratio just before the refrigerant compression capacity decreases, resulting in attainment of a second specific value, whereas, when the refrigerant compression capacity of the compressor increases from the second set value to the first set value, the aperture ratio of the linear expansion valve is controlled to increase by a second predetermined value from an aperture ratio just before the refrigerant compression capacity increases, resulting in attainment of a third specific value.

9. The method as set forth in claim 8, wherein when the refrigerant compression capacity of the compressor increases from the second set value to the first set value, the aperture ratio of the linear expansion valve is controlled to increase by the second predetermined value, which is lower than the first predetermined value, from the aperture ratio just before the refrigerant compression capacity increases, resulting in attainment of a third specific value.

10. The method as set forth in claim 9, wherein a difference between the first predetermined value and the second predetermined value is in a range of 20 to 40 pulses, where an aperture ratio '1' pulse of the linear expansion valve means that ('1' pulse/500 pulses)×100% of the linear expansion valve is opened.

11. The method as set forth in claim 8, wherein the second specific value $K_1'$ and the third specific value $K_2'$ are expressed by the following equations, respectively:

$$K_1' = V_0(1-y/100) + c_1$$

$$K_2' = V_1(1-y/100)$$

where $V_0$ denotes the aperture ratio of the linear expansion valve just before the refrigerant compression capacity decreases from the first set value to the second set value, $V_1$ denotes the aperture ratio of the linear expansion valve just before the refrigerant compression capacity increases from the second set value to the first set value, y denotes a refrigerant compression capacity ratio (%) of a compressor which starts its operation or stops an ongoing operation, and $c_1$ denotes a predetermined aperture ratio.

12. The method as set forth in claim 11, wherein the $c_1$ is in a range of 20 to 40 pulses, where an aperture ratio '1' pulse of the linear expansion valve means that ('1' pulse/500 pulses)×100% of the linear expansion valve is opened.

13. A method for controlling a linear expansion valve of an air conditioning system, wherein an aperture ratio of the linear expansion valve is controlled according to a cooling load, the method comprising:

a first step of checking whether air volume of an indoor fan is reduced; and a second step of reducing the aperture ratio of the linear expansion valve when the indoor air volume is reduced.

14. The method as set forth in claim 13, wherein when the air volume of the indoor fan is reduced from high to medium, or from medium to low, the aperture ratio of the linear expansion valve is reduced by a value in a range of 10 to 30 pulses, where an aperture ratio '1' pulse of the linear expansion valve means that ('1' pulse/500 pulses)×100% of the linear expansion valve is opened.

15. A method for controlling a linear expansion valve of an air conditioning system, wherein while operating in a heating mode, the air conditioning system stops an operation of an outdoor fan if outdoor temperature is higher than a predetermined temperature, and wherein while the system operates in the heating mode, if the outdoor fan is turned off, an aperture ratio of the linear expansion valve decreases by a third predetermined value from an aperture ratio just before the outdoor fan is turned off, and, if the outdoor fan is turned on after being turned off, the aperture ratio increases by a fourth predetermined value from an aperture ratio just before the outdoor fan is turned on.

16. The method as set forth in claim 15, wherein the fourth predetermined value is lower than the third predetermined value.

* * * * *